United States Patent
Jackson et al.

[15] 3,650,796
[45] Mar. 21, 1972

[54] PHOTOLITHOGRAPHIC MASKS

[72] Inventors: Thomas Meirion Jackson, Stortford; Eric Langley Bush, Waltham Cross; Thomas John Rowe, Stortford; David John Moule, Saffron Walden, Essex, all of England

[73] Assignee: Standard Telephones and Cables Limited, London, England

[22] Filed: May 27, 1969

[21] Appl. No.: 828,367

[30] Foreign Application Priority Data

June 6, 1968 Great Britain......................26,940/68

[52] U.S. Cl..........................................117/8, 96/36.2, 117/8, 117/46 CC, 117/93.31, 117/212, 117/226
[51] Int. Cl..........................................B44c 1/22, B44d 1/50
[58] Field of Search.................117/8, 93.3, 93.31, 212, 226, 117/46 CC; 96/36.2, 36 CB

[56] References Cited

UNITED STATES PATENTS

| | | |
|---|---|---|
| 2,688,566 | 9/1954 | Arnold et al.............................117/46 |
| 2,697,028 | 12/1954 | Baker...................................117/46 X |
| 3,027,278 | 3/1962 | Reick......................................117/46 |
| 3,236,707 | 2/1966 | Lins.......................................96/36.2 |
| 3,281,261 | 12/1966 | Lynch................................117/46 X |
| 3,395,970 | 8/1968 | Machell...................................117/46 |
| 3,360,398 | 12/1967 | Garibotti.............................117/93.3 |
| 3,427,120 | 2/1969 | Shindo et al........................117/46 X |

*Primary Examiner*—Alfred L. Leavitt
*Assistant Examiner*—Alan Grimaldi
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A method of making a photolithographic mask comprising the steps of depositing upon a transparent substrate a thin film of a polymeric material which is capable of being pyrolized to form thin film on the substrate, heating the film in order that the film is pyrolized, and removing selected areas of the pyrolized film in an oxidizing atmosphere by means of a laser beam to form the desired mask pattern.

2 Claims, No Drawings

PHOTOLITHOGRAPHIC MASKS

BACKGROUND OF THE INVENTION

This invention relates to a method of making photolithographic masks including the step of laser machining the desired pattern in a mask blank consisting of a thin film supported on a transparent substrate.

Masks have previously been made by inscribing with the laser beam the desired pattern in a metal film of the order of 500 A. thick deposited on a transparent substrate. However it has been found that, when such metal films are employed, the laser machining tends to leave a certain amount of debris in the machined tracks, and this debris is not readily removed either by ultrasonic cleaning or by repeated laser machining over the same track. This problem of debris is believed to arise from the fact that most metals melt prior to evaporation, and it is thought that at the focus of the laser machining beam the metallic film is raised to its molten state, but thereafter it does not evaporate quickly enough to prevent its agglomeration into small spherules under the influence of surface tension. These spherules are relatively immune to subsequent laser machining merely on account of their large thickness compared with that of the undisturbed metallic film.

SUMMARY OF THE INVENTION

An object of this invention is to provide for an improved photolithographic mask.

Another object is to provide an improved method of obtaining a photolithographic mask.

According to the present invention there is provided a method of making a photolithographic mask including the steps of depositing upon a transparent substrate a thin film of a polymeric material which is capable of being pyrolized to form on the substrate a film having an aliphatic or aromatic structure, heating the film so as to pyrolize it, and removing selected areas of the pyrolized film in an oxidizing atmosphere by means of a laser beam to form the desired mask pattern.

DESCRIPTION OF THE PREFERRED EMBODIMENTS

This invention circumvents the problem of agglomeration by the use of a material which decomposes under the action of laser machining to form gaseous or at least highly volatile products of decomposition. Polymeric material is employed because to be suitable as a photolithographic mask material, the polymer must be strongly absorbing at the wavelength used to expose the photoresist, which is commonly the ultraviolet mercury resonance line. In order to be capable of being machined, the material must also be at least partially absorbing at the wavelength used for laser machining.

An examination of the debris problem as set out above together with its solution according to this invention points to the possibility of a more simple solution, namely the use of a carbon film deposited on the substrate from a liquid suspension of amorphous carbon or graphite particles. However owing to the particular nature of the carbon it has been found virtually impossible to obtain by this method a pinhole free film of appropriate thickness for laser machining, and so its use merely serves to substitute one problem for another.

For the working of this invention the pyrolized polymeric material referred to above preferably has a conjugate structure which may be either aromatic or aliphatic. Such materials are comparatively insoluble, but this is more of an advantage than a liability because insolubility militates for dimensional stability of the mask and yet presents no problem in obtaining the material in thin film form because this is made by pyrolysis of a polymeric material which is in general much more soluble and can therefore be readily deposited from solution on a substrate in the form of a thin film.

Examples of polymers which will pyrolize to a suitable aliphatic structure are polyvinyl alcohol and the polyvinyl halides such as p.v.c.; polyacrylonitrile falls into the class of materials which can be pyrolized to form aromatic examples of the required structure.

To make a mask using polyacrylonitrile (PAN) a quantity of solid PAN is dissolved in dimethylformamide, a suitable concentration being given by 10 grams dissolved in 100 ml. A clean glass substrate is coated on one side with a film of the solution and the excess liquid is spun off by spinning the substrate about an axis normal to its plane at 6,000 r.p.m. thereby producing a uniform thin film. This film has then to be pyrolized, and to do this it has been found preferable to heat the substrate in two stages in order to reduce the chance of bubbles being formed. Therefore the substrate is heated for about 5 minutes in an oven at 150° C. and is then transferred to a furnace at 400° C. for a further 5 minutes. Pyrolisis is evident from the fact that the heating turns the previously transparent film a dark orange brown. Films produced in this way are immediately ready for laser machining which can be effected with a helium-neon laser operating at $1.15\mu$.

The laser machining is carried out in air or other oxidizing atmosphere so that in the machining process all the products of decomposition which are formed are readily oxidized.

What is claimed is:

1. A method of making a photolithographic mask comprising the steps of:
   depositing upon a transparent substrate a thin film of polyacrylonitrile having a conjugate structure upon being pyrolized;
   heating said film in order that said film is pyrolized to form the desired structure; and
   removing selected areas of said pyrolized film in an oxidizing atmosphere by means of a laser beam to form the desired mask pattern.

2. A method according to claim 1, wherein said film is pyrolized by heating said film for approximately 5 minutes at a temperature of approximately 150° C. and then heating said film for about 5 minutes at a temperature of approximately 400° C.

* * * * *